(12) United States Patent
Koga

(10) Patent No.: US 6,906,614 B2
(45) Date of Patent: Jun. 14, 2005

(54) SELECTIVE CALL RADIO APPARATUS WITH IMPROVED DISPLAY FUNCTION

(75) Inventor: Kuniaki Koga, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/244,190

(22) Filed: Feb. 4, 1999

(65) Prior Publication Data

US 2003/0137402 A1 Jul. 24, 2003

(30) Foreign Application Priority Data

Feb. 18, 1998 (JP) .......................................... 10-035301

(51) Int. Cl.⁷ .............................................. H04Q 1/00
(52) U.S. Cl. ...................... 340/7.52; 340/7.55; 455/456
(58) Field of Search .............................. 340/7.52, 7.55; 455/456

(56) References Cited

U.S. PATENT DOCUMENTS

| | | | | |
|---|---|---|---|---|
| 4,477,807 A | * | 10/1984 | Nakajima et al. | 340/7.52 |
| 4,965,569 A | * | 10/1990 | Bennett et al. | 340/7.52 |
| 4,975,694 A | * | 12/1990 | McLaughlin et al. | 340/7.55 |
| 5,173,688 A | * | 12/1992 | DeLuca et al. | 340/7.55 |
| 5,430,436 A | * | 7/1995 | Fennell | 340/7.52 |
| 5,687,216 A | * | 11/1997 | Svensson | 455/466 |
| 5,793,304 A | * | 8/1998 | Sone | 340/7.55 |
| 5,861,818 A | * | 1/1999 | Ohtsuki | 340/7.52 |
| 6,166,621 A | * | 12/2000 | Burgan et al. | 340/7.55 |
| 6,400,256 B2 | * | 6/2002 | Amma | 340/7.52 |

FOREIGN PATENT DOCUMENTS

| | | |
|---|---|---|
| JP | 61-103327 | 5/1986 |
| JP | 1-167736 | 11/1989 |

* cited by examiner

*Primary Examiner*—Brian Zimmerman
(74) *Attorney, Agent, or Firm*—Scully, Scott, Murphy & Presser (57) ABSTRACT

A selective call radio apparatus includes a display unit, a storage unit for storing messages, an operation unit used to input instructions and data, a message receiving unit, and a control unit. The control unit reads out the messages from the storage unit to display on the display unit in a first display attribute in a message display mode in response to a display instruction supplied from the operation unit. Also, the control unit displays a new messages on the display unit in a second display attribute different from the first display attribute when the new message is received by the message receiving unit during the display of the messages.

16 Claims, 5 Drawing Sheets

→ the message #m (204). If the latest message

SELECTIVE CALL RADIO APPARATUS WITH IMPROVED DISPLAY FUNCTION

BACKGROUND OF THE INVENTION

1. Field of the Invention

The present invention relates to a radio selective call apparatus, and more particularly to a selective call radio apparatus having a function of displaying received messages on a display section.

2. Description of the Related Art

In a conventional selective call radio apparatus, received messages are stored in a storage section in the sequence of reception or in the predetermined order of priority. Instead, the received messages are classified into categories. The received messages stored in the storage section are read out and displayed on a display section upon a switching operation performed by a user of the selective call radio apparatus. Such a selective call radio apparatus is disclosed in Japanese Laid Open Patent Application (JP-A-Heisei 3-175827) and Japanese Examined Patent Application (JP-B-Heisei 6-50838).

Dozens of messages such as news and weather forecasts are sent per day in data receiving service to the selective call radio apparatus described above. However, those received messages are no read out and displayed each time every message is received. In ordinary use, whether any message has arrived at the receiver is checked occasionally. If there are any messages not yet read, the messages received after the previously read message are read out successively. Therefore, depending on condition, tens of messages may be read out successively. The receiver operates in such a manner that it displays the received latest message on the display section, when it receives the latest message during the readout of the messages.

Figure 1:
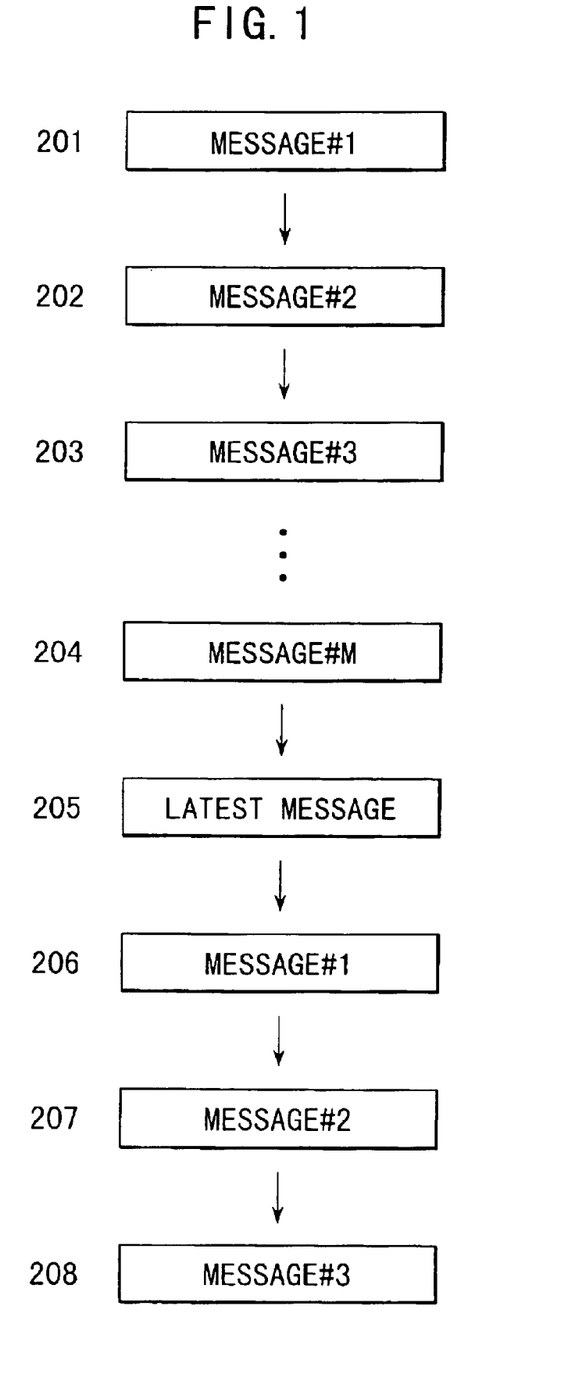
FIG. 1 is a diagram to explain a conventional message display function.

More specifically, as shown in FIG. 1, in the conventional method, the messages are read out in the order of the message #1 (201)→ the message #2 (202)→ the message #3 (#203)→... → the message #m (204). If the latest message is received during the reading of the message #m (204), the latest message (205) is displayed firstly. The next message to be displayed after the user finishes viewing the latest message is the message #1 (206). Since the latest message is received, the message #1 is secondary in recentness to the latest message. If the user continues the message reading, the message #2 (207) and the message #3 (203) are displayed in the described order.

In this way, the conventional selective call radio apparatus described above operates in such a manner that when it receives the latest message during the readout of the stored messages, it displays the received latest message on the display section. In this case, however, the latest message is suddenly displayed while the user is viewing the messages. Such a display operation is confusing for the user. This causes a problem in that the user cannot distinguish the latest message from other messages. That is, there is the possibility of the user mistaking the latest message for a message received in the past.

Also, when the user reads out the next message after the user has viewed the latest message, the message #1 is displayed again, regardless of whether the user had viewed the messages until then.

SUMMARY OF THE INVENTION

The present invention is accomplished to solve the above problems. Therefore, an object of the present invention is to provide a selective call radio apparatus with an improved message display function, in which the user can understand that a displayed message is the latest one, when the latest message is received and displayed during display of other message.

Another object of the present invention is to provide a selective call radio apparatus with an improved message display function, in which messages can be effectively displayed.

In order to achieve an aspect of the present invention, a method of displaying messages in a selective call radio apparatus includes the steps of:

displaying messages, which are already received, on a display unit in a first display attribute in a message display mode in response to a display instruction;

when a new message is received during the display of the messages, temporarily stopping the display of the messages on the display unit in the message display mode; and displaying the new message on the display unit in a second display attribute different from the first display attribute.

The second display attribute may be a color inversion or a highlighted display.

Also, the messages may be displayed on the display unit in an order in the first display attribute in the message display mode. In this case, the display of the new message is stopped in response to a display continuation instruction, and then remaining ones of the messages are displayed in the order in the first display attribute in the message display mode, after the stop of the display of the new message.

In the above, the order may be an order of reception of the messages. In this case, each of the messages is received and stored the received in a memory in the order of reception of the messages. Thus, the messages are sequentially read out from the memory in the order of reception of the messages.

Also, each of the messages may be received and stored in a memory together with a reception time. Thus, the messages are sequentially read out from the memory based on the reception times of the messages. In this case, the messages may be sequentially read out from the memory based on the reception times of the messages and a reference time. The reference time may be designated. In this case, the reference time and the reception time of each of the messages are compared with each other and ones of the messages previous to the reference time may be sequentially read out from the memory.

In order to achieve another aspect of the present invention, a selective call radio apparatus includes a display unit, a storage unit for storing messages, an operation unit used to input instructions and data, a message receiving unit, and a control unit. The control unit reads out the messages from the storage unit to display on the display unit in a first display attribute in a message display mode in response to a display instruction supplied from the operation unit. The control unit displays a new messages on the display unit in a second display attribute different from the first display attribute when the new message is received by the message receiving unit during the display of the messages.

The control unit displays the messages on the display unit in an order of reception of the messages in the first display attribute in the message display mode. Also, the control unit displays remaining ones of the messages in the order of reception in the first display attribute, in response to a display continuation instruction supplied from the operation unit. In this case, the control unit sequentially stores the messages received by the message receiving unit in the storage unit in the order of reception of the messages. The control unit includes a read pointer and a write pointer, and stores the message received by the message receiving unit in the storage unit using the write pointer and sequentially reads the messages from the storage unit using read pointer.

Also, the control unit may include a timer and a reference time register for holding a reference time. In this case, the control unit stores the message received by the message receiving unit in the storage unit together with a reception time from the timer, and sequentially reads out the messages from the storage unit based on the reception times of the messages and the reference time. The control unit sets the reference time in the reference time register when the reference time is supplied from the operation unit. The control unit sequentially reads ones of the messages previous to the reference time from the storage unit.

DESCRIPTION OF THE PREFERRED EMBODIMENTS

A selective call radio apparatus of the present invention will be described below in detail with reference to the attached drawings.

Figure 2:
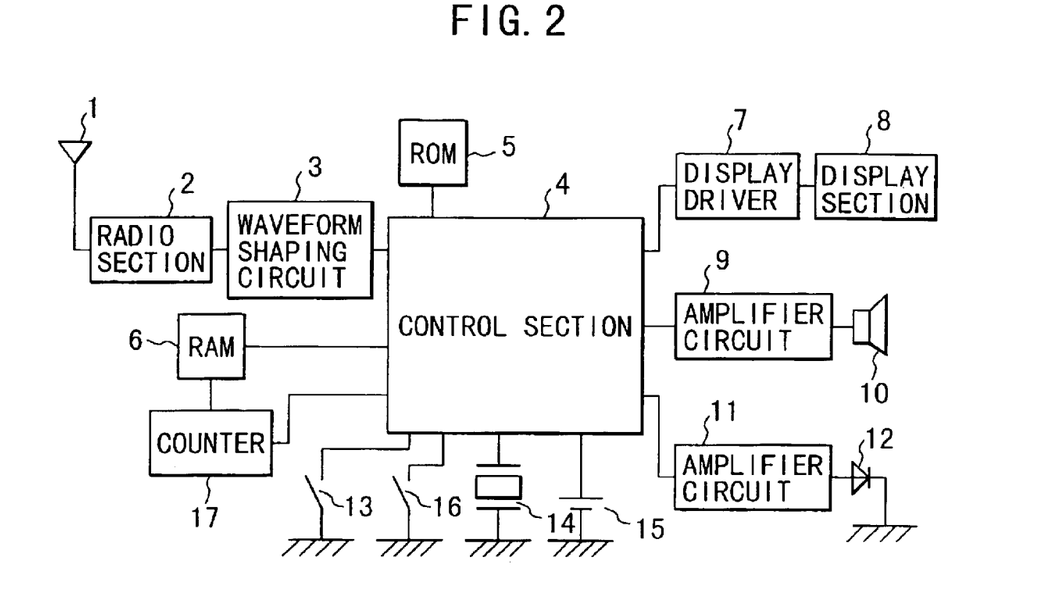
FIG. 2 is a block diagram illustrating the structure of a selective call radio apparatus with a message display function according to an embodiment of the present invention.

FIG. 2 is a block diagram illustrating the structure of the selective call radio apparatus with a message display function such as a pager according to the embodiment of the present invention. Referring to FIG. 1, the selective call radio apparatus according to the embodiment of the present invention is composed of an antenna 1, a radio section 2, a waveform shaping circuit 3, a control section 4, a rewritable ROM (Read-Only Memory) 5, a RAM (Random Access Memory) 6, a display driver 7, a display section 8, amplifier circuits 9 and 11, a speaker 10, an LED (Light-Emitting Diode) 12, a power supply switch 13, a clock generating circuit 14, a power supply 15, a switch 16 and a counter 17 as a read pointer. The power supply switch 13 and the switch 16 are contained in an operation section (not shown) which is used to input instruction and data.

The antenna 1 receives a radio signal. The received radio signal is amplified and demodulated by the radio section 2. The demodulated signal is converted by the waveform shaping circuit 3 to one having such a waveform as can be read by the control section 4.

The control section 4 includes a write pointer (not shown) and operates based on a program stored in the ROM 5. The control section 4 compares its own call number, which has been written in advance in the ROM 5, with the signal supplied from the waveform shaping circuit 3. When there is a coincidence between them, the control section 4 controls the amplifier circuit 9 to drive the speaker 10 such that alarm sound is sent out from the speaker 10. Also, the control section 4 controls the amplifier circuit 10 to drive the LED 12 such that the LED 12 is lighted. Thus, a call arrival is informed to the user.

When the received radio signal contains a message, the control section 4 stores the message in the RAM 6 using the write pointer. Also, when the message is displayed, the control section 4 reads out the message from the RAM 6 using the read pointer and controls the display driver 7 to drive the display section 8 such that the message is displayed.

In the selective call radio apparatus according to the embodiment of the present invention, the power supply is turned on in response to the operation of the power supply switch 13. At this time, the selective call radio apparatus operates in accordance with the clock signal supplied from the clock generating circuit 14, when the power supply 15 is turned on. Message selection is performed using the switch 16, and the counter 17 counts messages read out at the message readout time. The control section 4 reads messages stored in the RAM 6 using the read pointer to display on the display section 8. While the user is reading the messages successively, the counter 17 counts how many messages are read out.

When the latest message is received during the reading operation of the messages, the current message display is temporarily stopped or interrupted. Then, the latest message is displayed in such a way that it is distinguishable from other messages. When the display of the latest message is completed in response to a display continuation instruction supplied from the operation unit, the message next to the message which has been displayed immediately before the latest message is displayed based on the count of the counter 17 as the read pointer.

Figure 3:
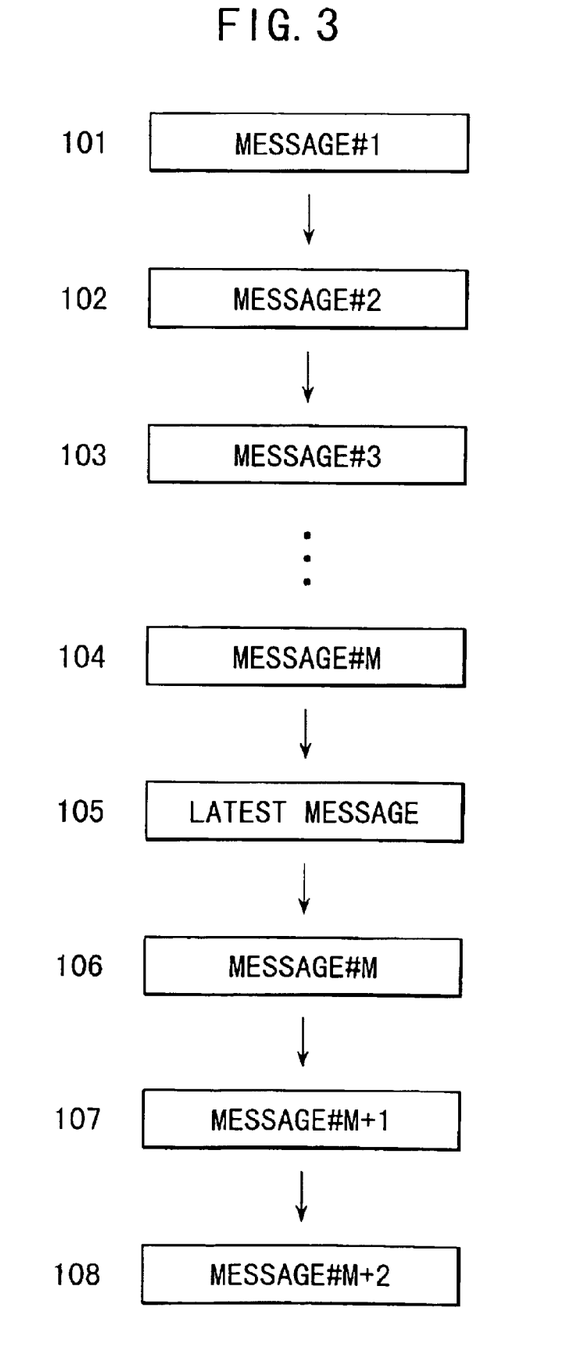
FIG. 3 is a diagram to explain the message display function according to the embodiment of the present invention.

FIG. 3 is a diagram illustrating a message display function according to the embodiment of the present invention. A difference between the message display function according to the embodiment of the present invention and the conventional message display function will now be described with reference to FIGS. 1, 2 and 3.

When the user reads out the messages, the messages are displayed in the order of their reception times, namely in the order from the latest message up to the oldest message. According to the embodiment of the present invention, the messages are read out in the order of a message #1 (101)→ a message #2 (102)→ a message #3 (103)→ . . . → a message #m (104).

If the latest message is received during the reading of the message #m (104), the display of message #m is interrupted and the latest message is displayed. The latest message (105) is displayed in a color inversion so that the latest message can be distinguished from the messages which the user has viewed until then. Thus, the latest message is displayed in a display attribute different from that of the messages which the user has viewed until then. The latest message may be displayed in a highlighted display or in boldface display or by way of varying the typeface.

When the user attempts to view the next message to input a display continuation instruction from the operation unit, the control returns to the message display state in which the user had viewed last. That is, following the latest message, the message #m (106), a message #m+1 (107), a message #m+2 (108) . . . are displayed in the described order.

Figure 4:
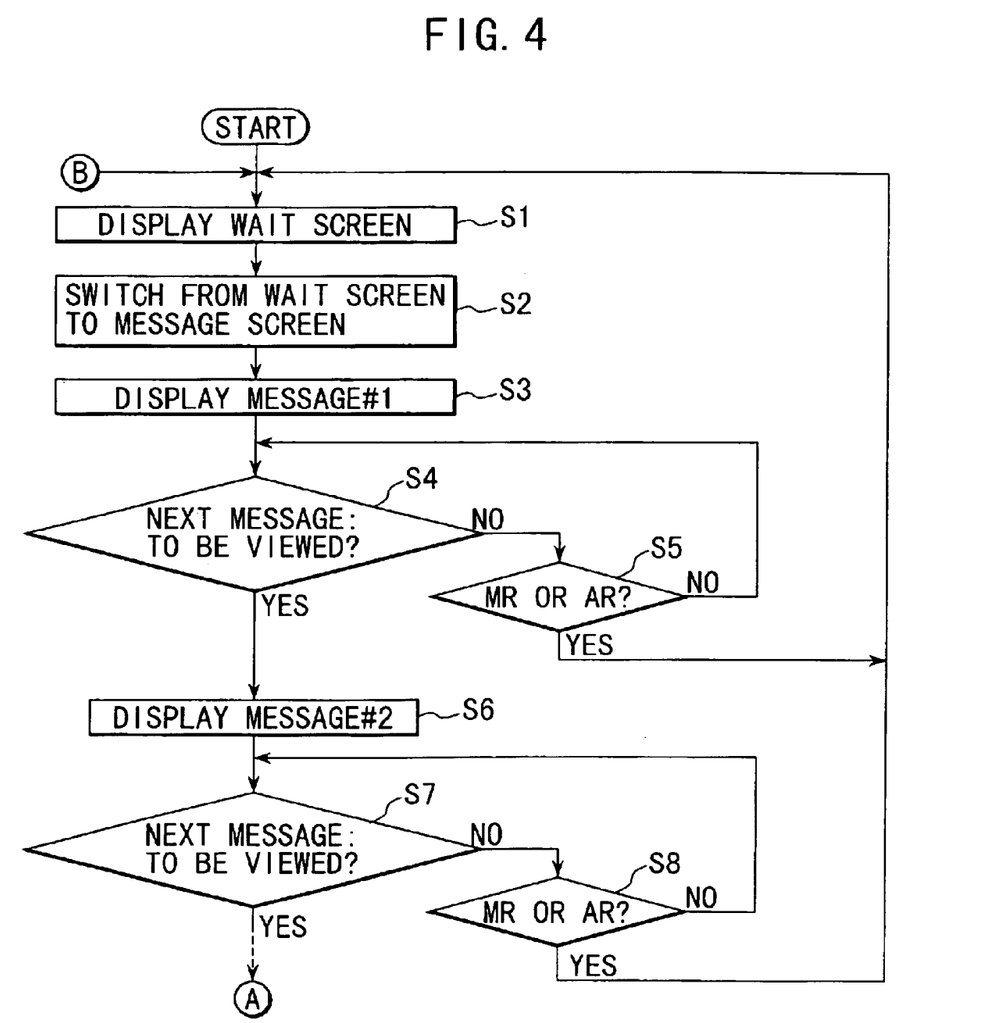
FIGS. 4 and 5 are flowcharts showing a message display operation according to the embodiment of the present invention.
Figure 5:
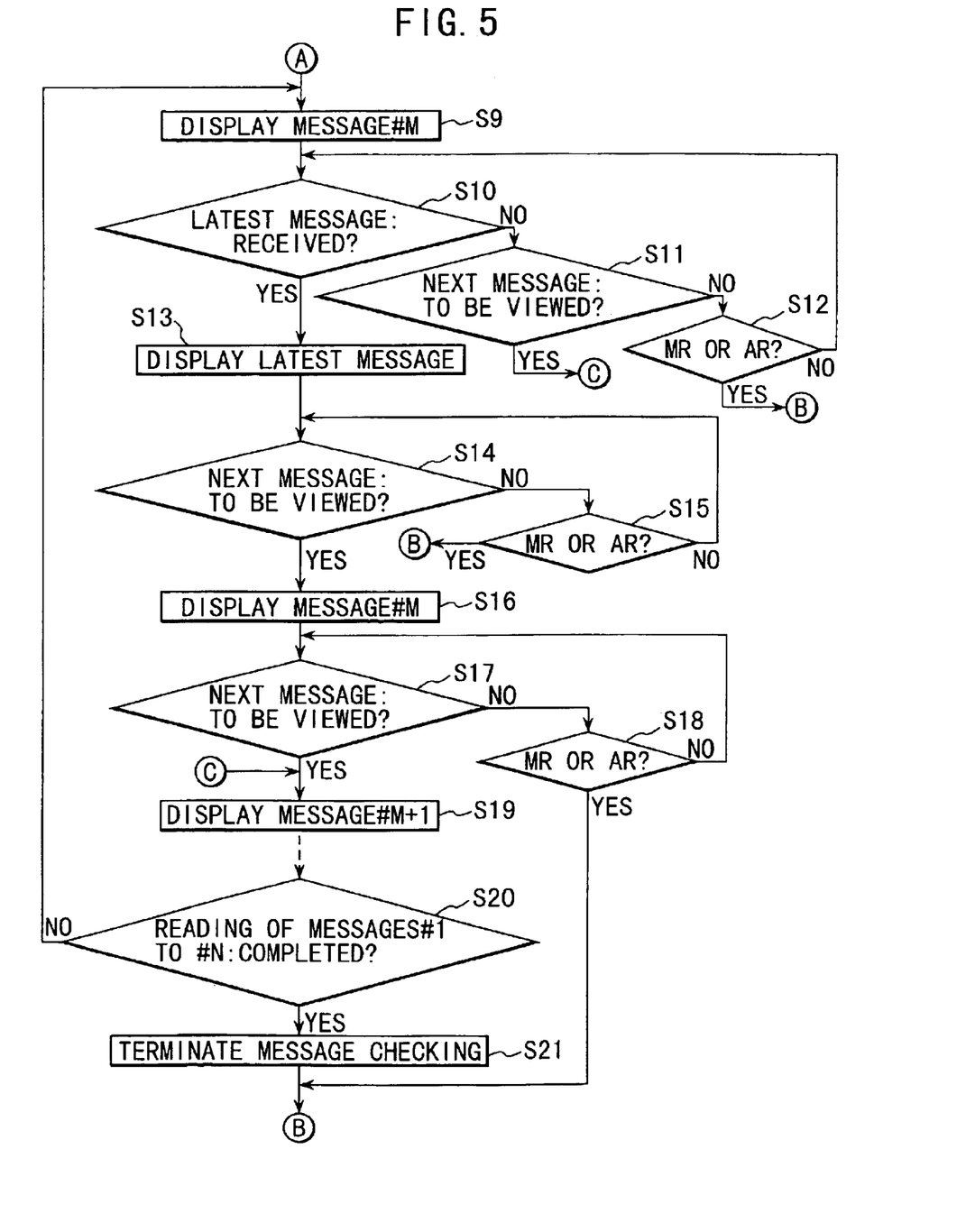

FIGS. 4 and 5 are flowcharts showing a message display operation of the selective call radio apparatus according to the embodiment of the present invention. The message display operation according to the embodiment of the present invention will now be described with reference to FIGS. 2 to 5.

According to the selective call radio apparatus, a message wait screen is initially displayed (a step S1 shown in FIG. 4). When attempting to read the messages stored in the RAM 6, the user inputs a message display instruction from the operation unit. At this time, the screen is switched from the message wait screen to a message display screen (step S2 shown in FIG. 4). Then, the message #1 having the most recent reception time among the messages received up to the present time is displayed (step S3 shown in FIG. 4).

After the above message #1 is displayed, it is determined whether the user wants to read the next message, based on a next message display instruction. The next message display instruction is inputted as the operation of the switch 16 of the operation unit. When the user performs no operation (No at a step S4 shown in FIG. 4), a step S5 is executed. At the step S5, it is determined whether a manual reset instruction as a message wait instruction is inputted through an operation of a reset switch (not shown) of the operation unit. If the manual reset instruction is not inputted (No at the step S5), the control returns to the step S4. If the manual reset instruction is inputted (Yes at the step S5), the control returns to the step S1. Also, when a predetermined time elapses without any operation of the operation unit after the message #1 has been displayed, an automatic reset instruction is issued as the message wait instruction (Yes at the step S5). As a result, the control returns to the step S1.

On the other hand, when wanting to read the next message, the user performs the switching operation of the switch 16 while the message #1 is displayed (Yes at the step S4), so that the counter 17 is incremented by "1". Then, message #2 having reception time recent next to the message #1 is read from the RAM 6, and displayed on the display section 8 through the display driver 7 (a step S6 shown in FIG. 3).

After the message #2 is displayed, it is determined whether the user wants to read the next message. When the user performs no operation (No at the step S7 shown in FIG. 4), a step S8 is executed, as in the above step S4. At the step S8, it is determined whether a manual reset instruction as the message wait instruction is inputted from the operation unit. If the manual reset instruction is not inputted (No at the step S8), the control returns to the step S7. If the manual reset instruction is inputted (Yes at the step S8), the control returns to the step S1. Also, when a predetermined time elapses without any operation of the operation unit after the message #2 has been displayed, the automatic reset instruction is issued as the message wait instruction (Yes at the step S8), as in the step S5. As a result, the control returns to the step S1.

On the other hand, when wanting to read the next message, the user performs the switching operation of the switch 16 while the message #2 is displayed (Yes at the step S7), the counter 17 is incremented by "1". Then, message #3 having reception time recent next to the message #2 is read from the RAM 6, and displayed on the display section 8 through the display driver 7.

It is supposed that the latest message is received while a message #m is displayed at a step S9 through the above-mentioned operations. If the latest message is not received (No at a step S10 shown in FIG. 5), the control advances to a step S11. In case where the latest message has been received, the control advances to a step S13 to display the latest message on the display section 8. The latest message is displayed in a display attribute different from those of the messages #1 to #m to be distinguishable from other messages (the step S13 shown in FIG. 5).

After the latest message is displayed, it is determined whether the user wants to read the next message. When the user performs no operation (No at a step S14 shown in FIG. 5), a step S15 is executed, as in the above step S4. At the step S15, it is determined whether the manual reset instruction as the message wait instruction is inputted from the operation unit. If the manual reset instruction is not inputted (No at the step S15), the control returns to the step S14. If the manual reset instruction is inputted (Yes at the step S15), the control advances to the step S1. Also, when the predetermined time elapses without any operation of the operation unit after the latest message has been displayed, the automatic reset instruction is issued as the message wait instruction (Yes at the step S15), as in the step S5. As a result, the control advances to the step S1.

On the other hand, when wanting to read the next message, the user performs the switching operation of the switch 16 while the latest message is displayed (Yes at the step S14), the counter 17 is incremented by "1". In this case, however, since the latest message is stored in the RAM 6, the number of messages stored in the RAM 6 increases by "1". Therefore, a message #m is read out from the RAM 6 again and displayed on the display section 8 through the display driver 7 (a step S16 shown in FIG. 5). Thus, the switching operation of the switch 16 functions as a display continuation instruction.

After the message #m is displayed, it is determined whether the user wants to read the next message. When the user performs no operation (No at the step S17 shown in FIG. 5), a step S18 is executed, as in the above step S4. At the step S18, it is determined whether the manual reset instruction as the message wait instruction is inputted from the operation unit. If the manual reset instruction is not inputted (No at the step S18), the control returns to the step S17. If the manual reset instruction is inputted (Yes at the step S18), the control returns to the step S1. Also, when a predetermined time elapses without any operation of the operation unit after the message #m has been displayed, the automatic reset instruction is issued as the message wait instruction (Yes at the step S18), as in the step S5. As a result, the control returns to the step S1.

On the other hand, when wanting to read the next message, the user performs the switching operation of the switch 16 while the message #m is displayed (Yes at the step S17), the counter 17 is incremented by "1". Then, message #(m+1) having reception time recent next to the message #m is read from the RAM 6, and displayed on the display section 8 through the display driver 7.

In this way, if the user wants to continue the message display, the same operations as those described above are repeated such that the message #m+1, the message #m+2, ... are displayed on the display section 8 in the order of recentness of their reception times.

AS described above, in the case where no latest message is received during the message display (the step S10 shown in FIG. 5), the control advances to the step S11. In this case, after the message #m is displayed, it is determined whether the user wants to read the next message. When the user performs no operation (No at the step S11 shown in FIG. 5), a step S12 is executed, as in the above step S4. At the step S12, it is determined whether the manual reset instruction as the message wait instruction is inputted from the operation unit. If the manual reset instruction is not inputted (No at the step S12), the control returns to the step S10. If the manual reset instruction is inputted (Yes at the step S12), the control returns to the step S1. Also, when the predetermined time elapses without any operation of the operation unit after the message #m has been displayed, the automatic reset instruction is issued as the message wait instruction (Yes at the step S12), as in the step S5. As a result, the control returns to the step S1.

On the other hand, when wanting to read the next message, the user performs the switching operation of the switch 16 while the message #m is displayed (Yes at the step S11), the counter 17 is incremented by "1". Then, the control advance to a step S19 to read message #(m+1) having reception time recent next to the message #m from the RAM 6 to display on the display section 8 through the display driver 7.

When the messages from message #1 to the last message #n in this case have been all read in the above-described manner (a step S20 shown in FIG. 5), the message display operation is terminated and the control returns to the initial wait screen at the step S1 (a step S21 shown in FIG. 5). If the remaining messages are present, the same operations as those of the step S9 to S19 are repeated.

Thus, under the condition that the ROM 6 contains n messages stored therein, if the latest message is received at the time the user has read the m messages from message #1 to message #m, the latest message is firstly displayed on the display section 8 as shown in FIG. 3. At this time point, the number of messages stored in the ROM 6 becomes n+1. Therefore, when the user attempts to read the next message by operating the switch 16 thereafter, the (m+1)-th message, which is the message #m which has been read immediately before the latest message, is displayed.

Therefore, even if the latest message is received while the user reads the messages, the latest message is displayed on the display section 8 so as to be distinguishable from other messages, under the control performed by the control section 4. Since the latest message is displayed so that the user can clearly distinguish the latest message from other messages, the user can read the latest message without confusion with the messages received in the past.

Furthermore, when the user desires to read the message next to the latest message, the user can read the message #m which has been read immediately before the latest message. This eliminates the inconveniences of having to repeatedly read the messages which the user has read once.

In the description, the messages stored in the RAM 6 are all displayed on the display section 8. However, when the message display instruction is inputted, a display number may inputted from the operation unit to the counter 17 at the same time. In this case, the control section 4 controls the display driver 7 to drive the display section 8 such that the message having the display number is first displayed and then the subsequent messages are displayed.

Also, the control section 4 may have a reception time register and timer (both not shown) instead of the counter 17. In this case, when a message is received, the control section 4 stores the message in the RAM 6 together with a reception time. Also, the control section 4 reads the messages stored in the RAM 6 in order based on the reception times of the messages. When the message is displayed and read, the reception time the displayed message is held and next the message having the reception time most closest to the held reception time and older than the held reception time is displayed and read.

In this case, as in the above, a reference time may be set in the reception time register. The control section 4 controls the display driver 7 to drive the display section 8 such that the message having the reception time most closest to the reference reception time and older than the reference reception time is first displayed and then the subsequent messages are displayed.

As described above, according to the selective call radio apparatus with the message display function of the present invention, when the latest message is received during the display of the stored messages, the latest message is displayed so as to be distinguishable from the stored messages. This makes it possible for the user to understand that when the latest message is received and displayed, the displayed message is the latest one.

What is claimed is:

1. A method of displaying messages in a selective call radio apparatus comprising the steps of:

displaying stored messages, which are already received, on a display unit in a first display attribute in a message display mode in response to a display instruction;

when a new message is received during the display of said stored messages, temporarily stopping the display of said stored messages on said display unit in said message display mode;

displaying said new message on said display unit in a second display attribute different from said first display attribute, said step of displaying stored messages includes displaying said stored messages on said display unit in an order in said first display attribute in said message display mode, said stored messages including a message being read immediately before receipt of said new message, stopping the display of said new message in response to a display continuation instruction;

displaying remaining ones of said stored messages in the order in said first display attribute in said message display mode, after stopping of the display of said new messages, and restoring said message being read immediately before receipt of said new message.

2. A method according to claim 1, wherein said second display attribute is a color inversion.

3. A method according to claim 1, wherein said second display attribute is a highlighted display.

4. A method according to claim 1, wherein the order is an order of reception of said stored messages.

5. A method according to claim 4, further comprising the step of:

receiving messages;

sequentially storing said received messages in a memory in the order of reception of said messages, and wherein said step of displaying stored messages includes sequentially reading out said messages from said memory in the order of reception of said messages.

6. A method according to claim 1, further comprising the step of:

receiving each of said messages;

storing the received messages in a memory together with a reception time, and wherein said step of displaying stored messages includes sequentially reading out said messages from said memory based on the reception times of said messages.

7. A method according to claim 6, wherein said step of displaying stored messages includes sequentially reading out said stored messages from said memory based on the reception times of said messages and a reference time, and wherein said method further comprises the step of: designating said reference time.

8. A method according to claim 7, wherein said reading out step includes:
comparing said reference time and the reception time of each of said stored messages; and
sequentially reading ones of said messages previous to said reference time.

9. A selective call radio apparatus comprising:
a display unit;
a storage unit for storing messages;
an operation unit used to input instructions and data;
a message receiving unit; and
a control unit for reading out said stored messages from said storage unit to display on said display unit in a first display attribute in a message display mode in response to a display instruction supplied from said operation unit, for displaying a new message on said display unit in a second display attribute different from said first display attribute when said new message is received by said message receiving unit during the display of said messages,
said control unit displays said stored messages on said display unit in an order of reception of said stored messages in said first display attribute in said message display mode,
said stored messages including a message being read immediately before receipt of said new message,
said control unit displays remaining ones of said stored messages in the order of reception in said first display attribute, in response to a display continuation instruction supplied from said operation unit, and
said control unit restores said message being read immediately before receipt of said new message.

10. A selective call radio apparatus according to claim 9, wherein said second display attribute is a color inversion.

11. A selective call radio apparatus according to claim 9, wherein said second display attribute is a highlighted display.

12. A selective call radio apparatus according to claim 9, wherein said control unit sequentially stores the messages received by said message receiving unit in said storage unit in the order of reception of said messages.

13. A selective call radio apparatus according to claim 12, wherein said control unit includes a read pointer and a write pointer, and stores the message received by said message receiving unit in said storage unit using said write pointer and sequentially reads said stored messages from said storage unit using said read pointer.

14. A selective call radio apparatus according to claim 9, wherein said control unit includes a timer and a reference time register for holding a reference time, and
wherein said control unit stores the message received by said message receiving unit in said storage unit together with a reception time from said timer,
and sequentially reads out said stored messages from said storage unit based on the reception times of said messages and said reference time.

15. A selective call radio apparatus according to claim 14, wherein said control unit sets said reference time in said reference time register when said reference time is supplied from said operation unit.

16. A selective call radio apparatus according to claim 14, wherein said control unit sequentially reads said stored messages previous to said reference time from said storage unit.

* * * * *